Dec. 20, 1955  H. W. LUST  2,727,809
METHOD OF AND APPARATUS FOR CONVERTING BULK FERTILIZER INTO PELLETS
Filed April 3, 1953  3 Sheets-Sheet 1
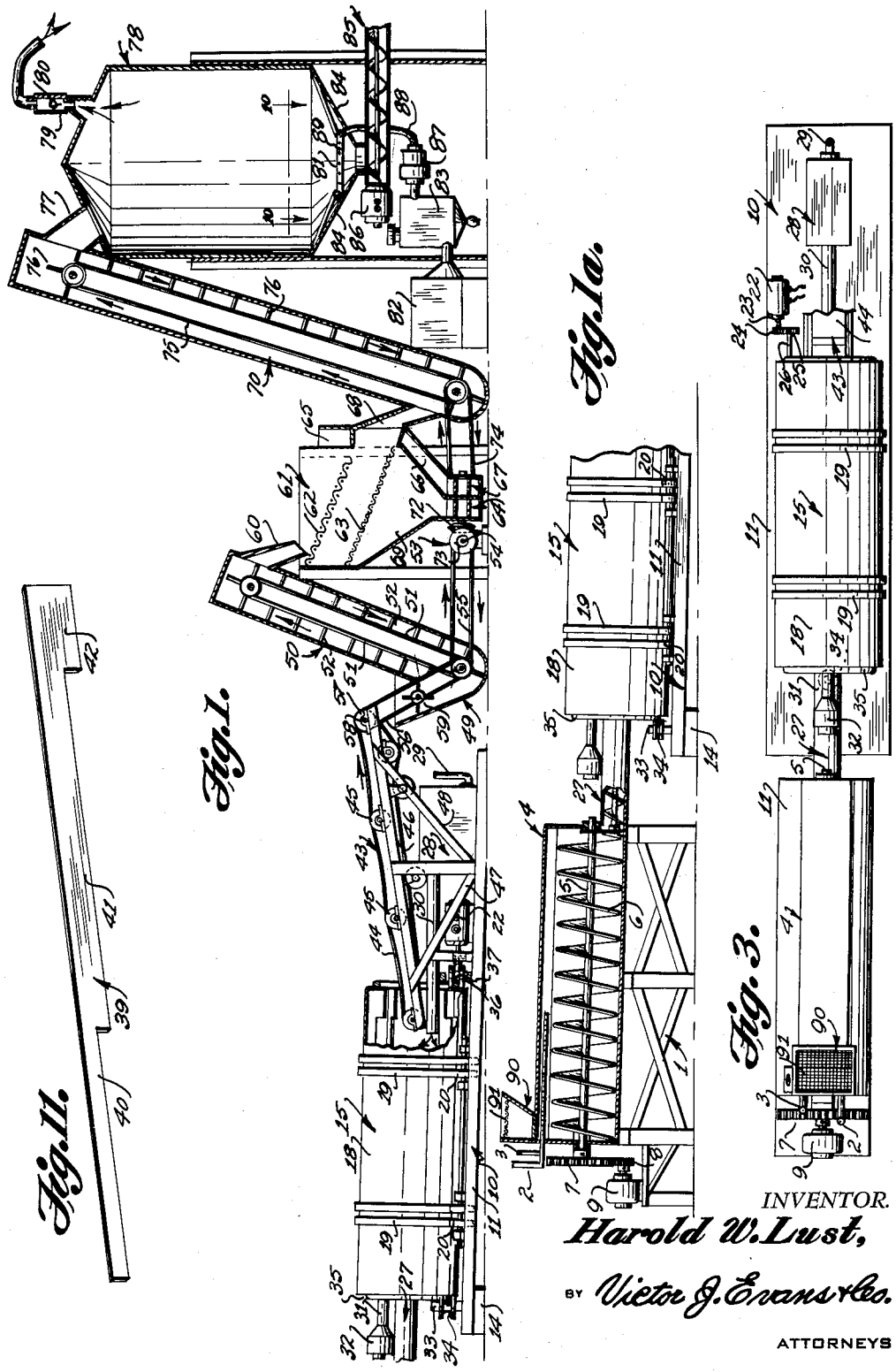
INVENTOR.
Harold W. Lust,
BY Victor J. Evans & Co.
ATTORNEYS

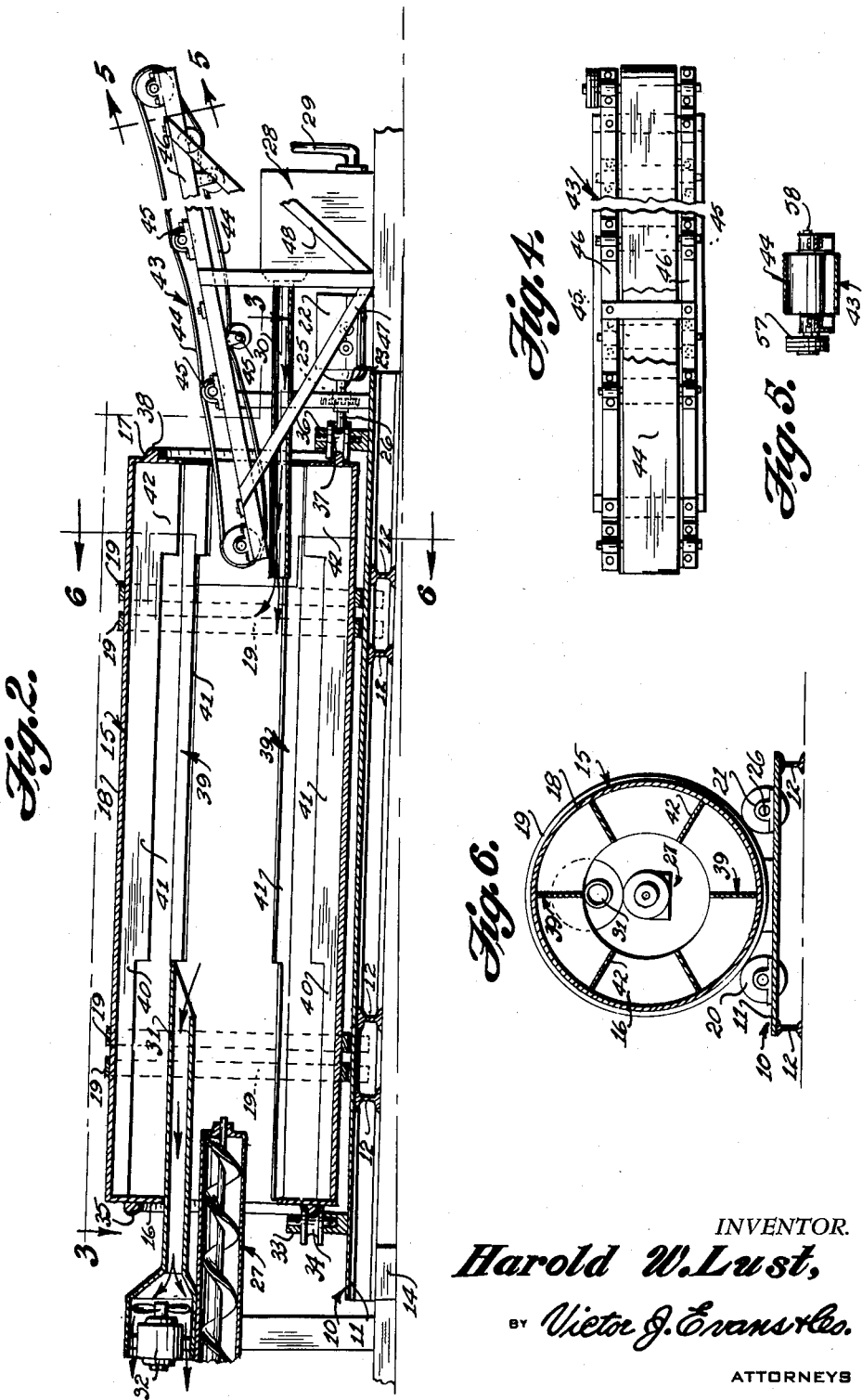

Dec. 20, 1955  H. W. LUST  2,727,809
METHOD OF AND APPARATUS FOR CONVERTING BULK FERTILIZER INTO PELLETS
Filed April 3, 1953  3 Sheets-Sheet 3
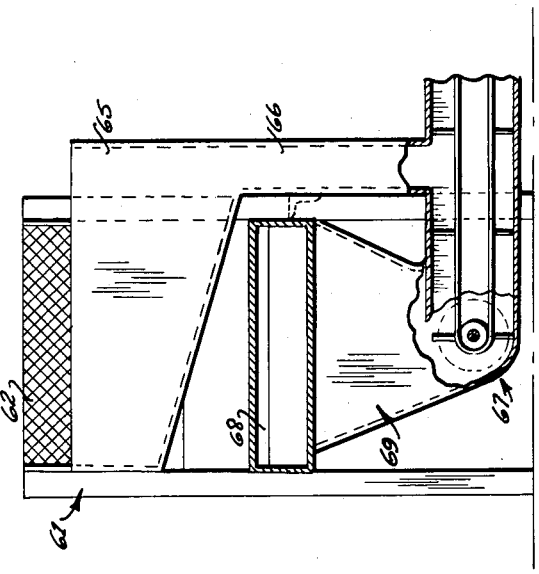
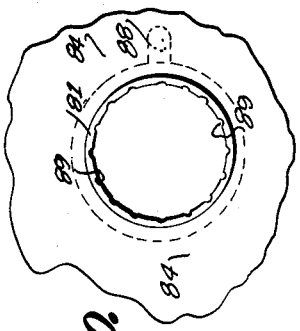
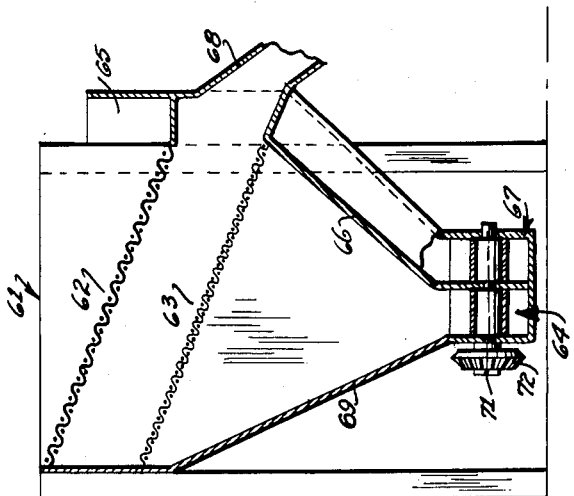
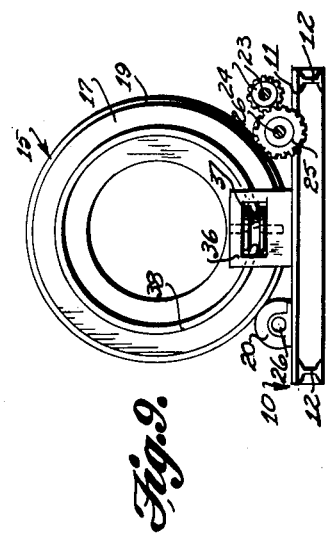
INVENTOR.
Harold W. Lust,
BY Victor J. Evans & Co.
ATTORNEYS

United States Patent Office 2,727,809
Patented Dec. 20, 1955

2,727,809

METHOD OF AND APPARATUS FOR CONVERTING BULK FERTILIZER INTO PELLETS

Harold W. Lust, Tyler, Tex.

Application April 3, 1953, Serial No. 346,698

1 Claim. (Cl. 23—259.3)

This invention relates to a method of and apparatus for handling material, and more particularly to a method of and apparatus for handling fertilizer.

The object of the invention is to provide a method of and apparatus for converting bulk fertilizer into pellets.

Another object of the invention is to provide a method of and apparatus for producing fertilizer pellets whereby the pellets will not blow away from their proper location on the ground, as does powdered fertilizer.

Another object of the invention is to provide the process and machine for making fertilizer which utilizes hot air to make the fertilizer plastic or soft and sticky whereupon the fertilizer becomes dried out after subsequent treatment to form pellets, the finished product adapted to be cooled and bagged for shipment to convenient locations.

Another object of the invention is to provide a machine for making pellets from bulk fertilizer, the machine being automatic in operation and simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the machine for making fertilizer pellets, constructed according to the present invention, and with parts broken away and in section.

Figure 1a is a fragmentary side elevational view, with parts broken away and in section.

Figure 2 is a longitudinal sectional view taken through the rotating drum or housing.

Figure 3 is a top plan view of the rotating housing.

Figure 4 is a plan view of one of the conveyors.

Figure 5 is a sectional view taken on the line 5—5 of Figure 2.

Figure 6 is a sectional view taken on the line 6—6 of Figure 2.

Figure 7 is an elevational view of the separator, with parts broken away and in section.

Figure 8 is a view taken at right angles to the view shown in Figure 7.

Figure 9 is an end elevational view of the housing.

Figure 10 is a plan view of the ring mounted within the hopper.

Figure 11 is a perspective view of one of the blades or vanes for the housing.

Referring in detail to the drawings, the numeral 10 designates a base which may include a platform 11 and a plurality of supporting beams 12. One end of the base 10 may be supported on a block 14 whereby the base 10 is inclined with respect to the horizontal. Rotatably supported on the inclined base 10 is an inclined drum or housing 15. The housing 15 is hollow and may be fabricated of any suitable material, and the housing 15 includes a pair of spaced parallel end walls 17 and 16, and an annular side wall 18. Extending around the annular side wall 18 and secured thereto is a plurality of spaced parallel rims 19 which define tracks. Arranged in engagement with the tracks 19 is a plurality of idler wheels or rollers 20, Figure 6, and arranged opposite from the idler rollers 20 is a plurality of drive rollers 21. The rollers 21 are adapted to be rotated or driven whereby the housing 15 is caused to rotate.

A means is provided for rotating the rollers 21, and this means comprises a motor 22 which may be connected to a suitable source of electrical energy, and the motor 22 drives a shaft 23 that has a gear 24 mounted thereon, Figure 3. The gear 24 is arranged in meshing engagement with a gear 25 that is mounted on a driven shaft 26. The plurality of drive rollers 21 which engage the tracks 19 are mounted on the driven shaft 26 so that upon actuation of the motor 22 the housing 15 is caused to rotate.

Extending into one end of the housing 15 is a screw conveyor 27, and the screw conveyor 27 is adapted to carry bulk fertilizer from a suitable source of supply to the interior of the housing 15. A means is provided for heating the material within the housing 15, and this means comprises a heater 28 which is arranged exteriorly of the housing 15. A conduit 29 may be connected to the heater 28 for supplying gas or other fuel to the heater 28, and a pipe or conduit 30 leads from the heater 28 to the interior of the housing 15 for supplying hot air to the housing 15. An exhaust conduit 31 communicates with the interior of the housing 15, and an exhaust fan 32 is arranged in communication with an end of the conduit 31 for withdrawing air or gas from the housing 15.

Extending upwardly from the base 10 and secured thereto is a pair of brackets 33 and 36. The bracket 33 rotatably supports a pulley 34, and a ring member 35 is secured to the outer surface of the end wall 16, the ring member 35 being arranged in engagement with the pulley 34. A second ring member 38 is arranged on the outside of the end wall 17 and is secured thereto, and the ring member 38 is arranged in engagement with a thrust pulley 37 that is rotatably mounted on a bracket 36. By means of the ring members 35 and 38, and their cooperating pulleys, there will be no possibility of the housing 15 shifting longitudinally during rotation thereof.

Extending longitudinally through the housing 15 and secured therein is a plurality of vanes or blades 39, Figures 2 and 11. Each of the vanes 39 includes a plurality of sections 40, 41 and 42, and it will be seen that these sections increase in size for a purpose to be later described.

A means is provided for removing the fertilizer from the interior of the housing 15, and this means comprises an endless conveyor 43 which is inclined. The conveyor 43 includes an endless belt 44 that is trained over suitable rollers 45, and the conveyor 43 further includes frame pieces 46, Figures 2 and 4 and 5. If desired, there may be provided immediately above the conveyor 43 suitable infrared lamps. The conveyor 43 may be supported by suitable braces 47 and 48.

Arranged below the upper or outer end of the conveyor 43 is a receiving bin 49 which is adapted to receive material from the conveyor 43. An inclined conveyor 50 extends downwardly into the bin 49 for removing the material from the bin 49, and the conveyor 50 includes an endless belt 51 having a plurality of spaced parallel fingers 52 extending therefrom. A motor 53 drives a shaft 54, and the shaft 54 may have a pulley or sprocket thereon over which is trained an endless belt or chain 55. The belt 55 serves to operate the conveyor 50, and the belt 55 also serves to operate an endless chain or belt 56 which leads to a sprocket or pulley 57 on the upper end of the conveyor 43, the pulley 57 being mounted on a shaft 58, Figure 5. A beater 59 may be interposed between the conveyor 43 and the conveyor 50.

Extending from the upper end of the conveyor 50 is a spout 60 whereby the material from the conveyor 50 is discharged through the spout 60 onto a separator 61, Figures 1, 7 and 8. The separator 61 includes a pair of spaced parallel screens 62 and 63. The screens 62 and 63 are of such a construction that the coarse fertilizer is retained on the screen 62 and passes through a passageway 65, then through a chamber 66 onto a conveyor 67 whereby the coarse fertilizer can be conveyed away to any suitable location. The fine sized fertilizer passes through the screen 62 and through the screen 63 into the compartment 69 and this fine sized fertilizer is deposited on a conveyor 64 whereby it can be conveyed away to any desired location. The medium sized fertilizer only passes through the upper screen 62 and then passes through a spout 68 onto the lower end of an inclined conveyor 70, Figure 1. The pair of conveyors 64 and 67 may be arranged side by side, and these conveyors may be operated from the motor 53 through intermeshing gears 72 and 73, the gear 72 for driving the conveyors 64 and 67 being mounted on a shaft 71. The conveyor 70 may be operated by a suitable belt or chain 74 that is operated by the motor 53, and the conveyor 70 includes an endless belt 75 that has a plurality of spaced parallel fingers 76 extending therefrom.

A discharge spout 77 serves to discharge the fertilizer from the upper end of the conveyor 70 into a hopper 78, and a pipe 79 having a check valve 80 therein extends from the top of the hopper 78. A ring member 81 is mounted on a false bottom 84 within the hopper 78 for a purpose to be later described. A conventional refrigerator 82 is arranged adjacent to the hopper 78, and the refrigerator 82 is adapted to supply cold air through a drying casing 83 that may contain calcium chloride. A screw conveyor 85 is adapted to receive the finished pellets of fertilizer from the hopper 78, and the screw conveyor 85 can convey these fertilizer pellets to any suitable location, as for example to a bagging machine. The screw conveyor 85 may be operated by a motor 86. A blower 87 serves to force or pump the cool dry air from the drying compartment 83 through a conduit 88, and the conduit 88 is connected to the ring member 81, Figures 1 and 10. The ring member 81 may have a plurality of openings or apertures 89 therein whereby the issuing air can enter the bottom of the hopper 78 to cool and dry the pellets therein.

From the foregoing, it is apparent that a method of and apparatus for providing or producing fertilizer in pellet form has been invented. In actual operation, the bulk fertilizer from a suitable source of supply may be conveyed to the interior of the housing 15 by means of the screw conveyor 27, the conveyor 27 receiving the bulk fertilizer from any suitable source. The housing 15 is constantly rotated due to the engagement of the drive rollers 21 with the tracks 19, the rollers 21 being driven by the motor 22. It will be noted that the housing 15 is inclined and that the plurality of vanes 39 are secured within the housing 15. Thus, the material within the housing 15 will enter at the upper end and travel by gravity towards the other or lower end of the housing. The material within the housing 15 is heated to the desired temperature by hot air generated within the heater 28 and directed into the housing 15 through the conduit 30, the exhaust fan 32 helping to maintain the proper circulation of hot air through the housing 15. As the material reaches the lower end of the housing 15, a portion thereof is deposited or received on the lower end of the inclined conveyor 43, and this material is conveyed upwardly and deposited in the bin 49. The conveyor 50 picks up the material from the bin 49 and discharges it through the spout 60 onto the separator 61. In the separator 61 the coarse or large size fertilizer pieces remain on the screen 62 and pass down onto the conveyor 67 where the coarse particles can be removed to any suitable location. The fine size fertilizer particles or pieces pass through both screens 62 and 63 and are received on the conveyor 64 whereby the fine particles can be also taken away to any desired position or place. The medium size fertilizer particles pass through the upper screen 62 but do not pass through the screen 63 so that these medium size pieces pass through the spout 68 and are received on the lower end of the inclined conveyor 70.

The inclined conveyor 70 raises the medium size fertilizer particles upwardly and discharges this material through the spout 77 into the hopper 78. The refrigerator 82 serves to generate cool air and this cool air passes through the drying chamber 83 and the blower 87 forces this cool dry air through the apertured ring 81 into the interior of the hopper 78 where the fertilizer pellets are cooled and dried. Finally the finished fertilizer pellets are received on the screw conveyor 85 whereby they can be conveyed away to any suitable location, as for example to the bagging machine.

The coarse and fine fertilizer particles may be conveyed to storage bins or to suitable warehouses. The rollers 34 and 37 take up any side thrust resulting from movement of the housing 15. The fertilizer fed into the housing 15 may be in a damp condition and the hot air helps to dry out this fertilizer. The check valve 80 lets fumes out of the hopper 78 but prevents air from entering the hopper 78. By making the fertilizer into pellets, the fertilizer will not blow off the ground as does ordinary fertilizer in dust-like form.

In the present invention the chemical heat derived from the addition of ammonium hydroxide to phosphoric acid in the superphosphate is utilized. Also, the small amount of water which is in the form of a nitrogen solution is used as an aid to forming the pellets, and the present machine combines the operations of forming the pellets, aerating and drying. It will be noted that the vanes 39 include a first portion 40 which help form the pellets, and an intermediate section 41 which carries the fertilizer during the drying thereof, and the final section 42 wherein the fertilizer is discharged onto the conveyor 43. By blowing hot air into the tank 51, the fertilizer becomes plastic or soft and sticky, the temperature of the fertilizer being raised from about 120 degrees F. to 200 degrees F. At this high temperature the fertilizer becomes dry and plastic and becomes ball-like or in the shape of pellets. These pellets are then discharged onto the belt conveyor 43 and the pellets in the hopper 78 are cooled so that the final product has the same temperature as is found in an ordinary room. Thus, it will be seen that it will be possible to provide pellets in finished form and these pellets may be conveyed to a suitable bagging operation. The cold dry air passing upward through the hopper 78 carries away any moisture and heat from the finished product and this exhaust air passes outwardly through the conduit 79.

Referring to Figures 1a and 3, the numeral 1 designates a stand, and a pair of pipes or conduits are indicated by the numerals 2 and 3 for a purpose to be later described. A casing 4 is mounted on the stand 1, and rotatably extending through the casing 4 is a shaft 5 having a spiral feed member 6 mounted thereon. A gear 7 is mounted on the outer end of the shaft 5, and the gear 7 meshes with a gear 8 that is adapted to be rotated by a motor 9. A charge hopper 90 is arranged in communication with the ribbon mixer casing 4, and the charge hopper 90 may have a screen 91 mounted therein, Figure 1a. The ribbon mixer casing 4 is arranged in communication with the screw conveyor 27.

The ribbon mixer 4 may have a 24" diameter and the screw conveyor 27 may have an 8" diameter. Also the edge of the ribbon or spiral 6 may be beveled to avoid packing or breaking of the shaft and the discharge surface of the ribbon may be faced with a suitable material to prevent wear thereon. The pipes 2 and 3 may be made of suitable material such as aluminum or cast iron and may be used for carrying nitrogen solutions and sulphuric or phosphoric acid liquor. The process of the present invention involves the use of various other chemicals such as ammonium nitrate, sulphate of ammonia, triple phosphate, potash, dolomite, single phosphate, calcined dolomite, quicklime, sulphuric acid liquor, phosphoric acid liquor, and a wetting agent. In actual use, the raw products including triple or single phosphate and 50% or 60% potash, sulphate of ammonia, dolomite and/or the combination of any two or more of these are all weighed on scales in the rear of the plant and elevated and screened so that the coarse material goes through a clod breaker and is then reelevated and rescreened. Next, the material goes into the ribbon mixer 4 where it is mixed with the various liquors flowing through the pipes 2 and 3, as the case may be. When the final product is cold and wet, then the use of anhydrous and phosphoric acid or sulphuric acid are advantageous to provide extra heat. Also, arranged above the discharge belt conveyor 43 are a plurality of banks of infrared lights which provide extra heat in addition to the gas fired heater. Furthermore, by using calcined dolomite and/or quicklime, extra heat will be provided to take up any excess moisture immmediately so that large balls are not formed in the pellet forming drum 15.

The chemical reaction of the ammonium hydroxide of the nitrogen solutions with phosphoric acid of the triple or single phosphate and the phosphoric and/or sulphuric acid liquor gives a hot wet compound and mixture which is desirable as it enters the drum 15. The moisture content is carefully checked at all times since if the material is too wet, or if the material is too dry the pellets will not form. Furthermore, the control of the pellet forming apparatus can be accomplished by controlling the amount of fines and coarse that are returned to the charge hopper 90. The members 39 are shaped so that the fertilizer is lifted up along the side of the drum 15 as the drum revolves to thereby cause the fertilizer to be kept in motion and in this rolling process the pellets are formed. Thus, the pellets will be formed in the first section 40, and in the next section 41 the pellets are picked up and dried by hot air so that at this stage the pellets are firm and will not now break up. The discharging of the pellets is done on the section 42 of the vanes 39 and this material is discharged onto the lower end of the conveyor 43.

By using the aforementioned apparatus and process, the cost of manufacturing the fertilizer pellets will be extremely low and also no free ammonia can escape since the mixer is completely enclosed, and the mixer 4 changes an intermittent feed to a constant discharge to the drum 15, due to the fact that the ribbon 6 does not move all of the charge forward at one time. Thus, the bottom portion of the charge is moving forward constantly while the center is churned so that the end of one charge and the beginning of another are thoroughly mixed. A wetting agent is used so that all particles of the phosphate come in contact almost immediately with the ammonium hydroxide to thus assist in completing the chemical reaction as fast as possible.

In general the method of the present invention is as follows. The material is first weighed and screened, then the charge is ammoniated, then sufficient calcined dolomite, quicklime or a dehydrating agent is added, then the material is mixed and the pellets are formed. Next, the dehydrating and reheating takes place and the material can be stockpiled or screened and the fines and coarse can be returned to the scales. The finished product can be stored in tanks, and the usable product can be cooled and dried with cool dry air, and the dehumidifier takes out about 75% of the moisture from the air and the calcium chloride takes out the balance. Air is forced into the tank or hopper 78 under about 4 pounds pressure at the bottom of the tank and the fertilizer will be cool in about 24 to 92 hours, depending upon the tonnage in the tank or hopper 78.

As the fine, hot, dry particles of fertilizer move to the discharge end of the pellet forming device, they come in contact with the stream of air being sucked in around the burner, which moves them toward the charge end of the pellet forming device and due to the decrease in velocity of the air, these particles will settle out to a large extent on the moist fertilizer. This will prevent the fertilizer from balling up in sizes too large to pass the coarse screen. Any type of mixer can be used with the present invention.

I claim:

In an apparatus for providing fertilizer pellets of the type including a first inclined endless conveyor, a second inclined conveyor for receiving material from said first conveyor, a separator for receiving material from said second conveyor and including spaced parallel screens, said separator serving to separate the medium size particles from the coarse and fine sized particles, conveyor means for removing the coarse, medium, and fine size particles, a third conveyor for receiving the medium size material from said separator, a hopper for receiving the material from said third conveyor, a refrigerator means for supplying dry cold air to said last named hopper, conveyor means for removing the pellets of fertilizer from said hopper, the combination with an inclined base, a housing rotatably mounted above said base, a plurality of spaced parallel rims secured to the outer surface of said housing, idler rollers arranged on one side of said housing and engaging said rims, a motor arranged contiguous to said housing, a plurality of drive rollers arranged opposite from said idler rollers and driven by said motor, said drive rollers engaging said rims for rotating said housing, brackets extending upwardly from said base, a thrust pulley rotatably supported by each of said brackets, a plurality of vanes extending longitudinally through said housing and each including a plurality of sections of different sizes, a screw conveyor extending into an end of said housing for conveying bulk fertilizer from a source of supply to said housing, a heater arranged exteriorly of said housing for supplying hot air to the interior of said housing, and means for supplying fertilizer to said screw conveyor.

References Cited in the file of this patent
UNITED STATES PATENTS

| | | |
|---|---|---|
| 1,921,114 | Brackelsberg | Aug. 8, 1933 |
| 2,052,329 | Wendeborn | Aug. 25, 1936 |
| 2,164,986 | Cox et al. | July 4, 1939 |
| 2,167,432 | Cox et al. | July 25, 1939 |
| 2,268,816 | Gabeler et al. | Jan. 6, 1942 |
| 2,287,759 | Hardesty et al. | June 23, 1942 |
| 2,448,126 | Shoeld | Aug. 31, 1948 |